United States Patent [19]
Schindler

[11] Patent Number: 4,967,865
[45] Date of Patent: Nov. 6, 1990

[54] SUPPLEMENTARY STEERING SYSTEM

[75] Inventor: Erich Schindler, Waiblingen, Fed. Rep. of Germany

[73] Assignee: Daimler-Benz AG, Stuttgart, Fed. Rep. of Germany

[21] Appl. No.: 309,790

[22] Filed: Feb. 13, 1989

[30] Foreign Application Priority Data

Feb. 13, 1988 [DE] Fed. Rep. of Germany ....... 3804587

[51] Int. Cl.$^5$ .......................... B62D 5/04; B62D 6/04
[52] U.S. Cl. .................................... 180/79.1; 180/140; 180/197; 280/91; 364/424.05; 364/426.02
[58] Field of Search ...................... 180/140, 141, 79.1, 180/197; 280/91; 364/424.05, 426.02

[56] References Cited

U.S. PATENT DOCUMENTS

| 3,866,706 | 2/1975 | Linch et al. | 180/79.1 |
| 4,706,771 | 11/1987 | Kawabe et al. | 180/140 |
| 4,832,149 | 5/1989 | Degonde | 180/140 |
| 4,840,389 | 6/1989 | Kawabe et al. | 180/140 |

FOREIGN PATENT DOCUMENTS

| 0150856 | 8/1985 | European Pat. Off. . |
| 3300640 | 7/1974 | Fed. Rep. of Germany . |
| 3532247 | 3/1986 | Fed. Rep. of Germany . |
| 3608420 | 9/1986 | Fed. Rep. of Germany . |
| 1468045 | 3/1977 | United Kingdom . |

Primary Examiner—Mitchell J. Hill
Attorney, Agent, or Firm—Evenson, Wands, Edwards, Lenahan & McKeown

[57] ABSTRACT

The supplementary steering system operates automatically as a function of the change of the transverse velocity ($\dot{v}_y$) of the vehicle to provide compensation steering movements to stabilize a vehicle in skidding situations. The system relies on the fact that a great increase in vehicle transverse velocity is characteristic of skidding movements. Critical travel conditions can be stabilized by a rapid reaction to the change of transverse velocity. Under steady travel conditions, i.e., when only a negligible change of transverse vehicle velocity occurs, the supplementary steering system is not actuated, or is reset to its central position.

9 Claims, 3 Drawing Sheets

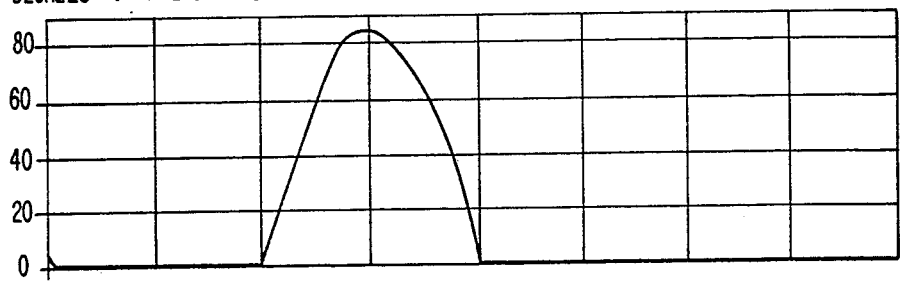
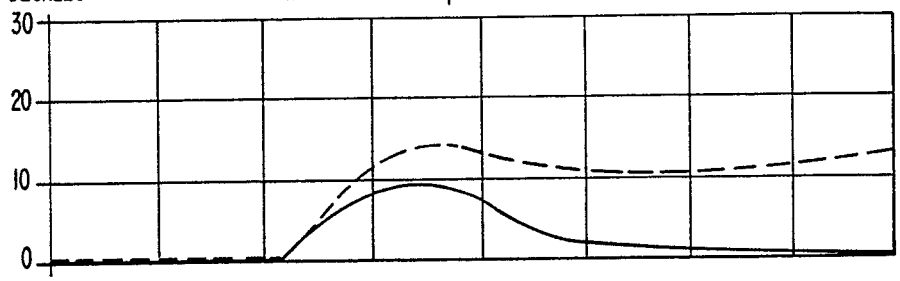
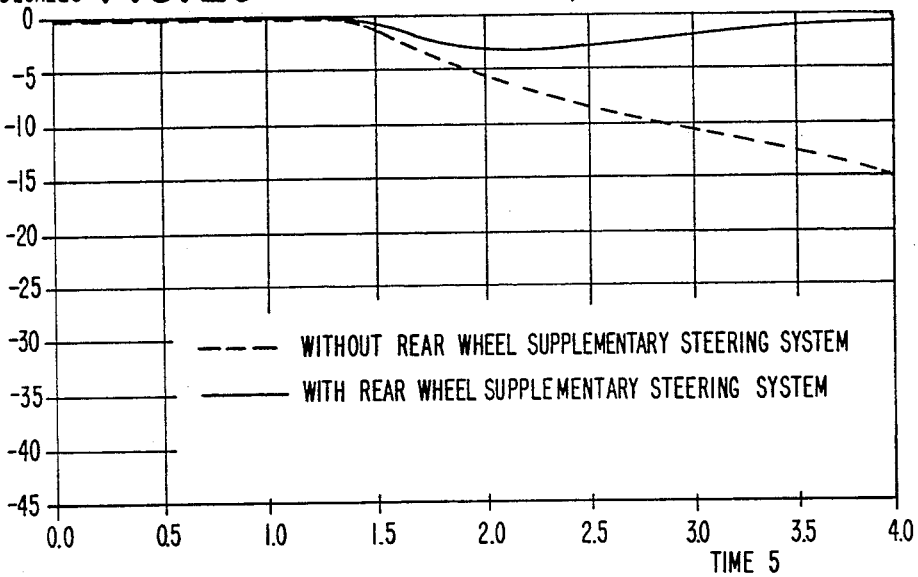

SUPPLEMENTARY STEERING SYSTEM

BACKGROUND AND SUMMARY OF THE INVENTION

The invention relates to a supplementary steering system, especially a rear wheel supplementary steering system for passenger motor vehicles having a regulating device which deflects the steered wheels, or the steerable rear wheels as a function of a quantity correlated with vehicle longitudinal velocity, transverse acceleration and yaw velocity, in the sense to stabilize the vehicle.

A similar supplementary steering system is known from German Unexamined Patent Application DE-OS No. 33 00 640. That supplementary steering system is intended to compensate the disturbance movements of the vehicle during the reactionless time of the driver.

It is indeed pointed out, quite generally, in German Unexamined Patent Application DE-OS No. 33 00 640 that the control of the supplementary steering system can take place as a function of the longitudinal velocity, the transverse acceleration and/or the yaw velocity. However, this publication does not contain any precise instruction as to how unstable vehicle conditions, which can lead to skidding movements, are to be detected in due time and stabilized in an optimal manner by the supplementary steering system.

Thus, the object of the invention is to provide a supplementary steering system which is especially suitable to achieve a particularly effective stabilization of the vehicle in the event of an increased risk of skidding.

This object is achieved when the occurrence of a skidding movement of the vehicle associated with a rapidly increasing transverse velocity of the vehicle occurs. A regulating device deflects the steered rear wheels in a sense of counter-steering for counteracting the skidding movement. Also, the respective lock angle of these wheels is controlled as a function of the change of vehicle transverse velocity, or of a quantity correlated therewith.

The change of transverse velocity is determined by: $\dot{v}_y = a_y - v_x \dot{\psi}$, where $a_y$ represents the transverse acceleration, $v_x$ represents the longitudinal velocity, and $\dot{\psi}$ represents the yaw velocity of the vehicle.

The invention is based on the finding that a rapid growth of the transverse velocity of the vehicle is characteristic of the commencement of skidding movements of a vehicle. Accordingly, the fundamental concept of the invention consists in counter-steering with the steered wheels, especially the rear wheels, in the event of the occurrence of changes of transverse velocity and thus preventing, or at least slowing down, the incipient process of rotary movement of the vehicle. The supplementary steering system invariably becomes effective when changes of transverse velocity occur. As soon as the transverse velocity of the vehicle is no longer changing, the steering lock, caused by the supplementary steering system is withdrawn again, so that the steering range, which is present for the stabilization of critical vehicle conditions of the supplementary steering system, is again fully available for new critical situations. Advantageously, at the same time, the driving behavior under steady driving conditions remains unchanged as compared with a vehicle without a supplementary steering system.

Additionally, or alternatively, it can be provided that the deflection of the steered or rear wheels is made as a function of the change of transverse velocity as well as of the change with time (rate of change of the change of transverse velocity).

Furthermore, according, to a preferred embodiment of the invention, a theoretical value for the change of transverse velocity of the vehicle can be determined from travel speed and manually set steering deflection can be compared with the respective actual value, and with the regulating device operating as a function of the difference between theoretical value and actual value; and in this embodiment, it is guaranteed that the driving behavior is unchanged as compared with a vehicle without a supplementary steering system in non-critical situations. Accordingly, a driver would not require any acclimatization period on transferring to a vehicle with a supplementary steering system, since the latter becomes effective only in critical situations in the sense of an automatic stabilization of the vehicle and thus in the sense of a facilitation of the control of the vehicle.

It is advantageous to have the deflection of the steered or rear wheels be as a function of the change of vehicle transverse velocity as well as of the change with respect to time (rate of change of the change of transverse velocity). Also, theoretical values of the change of transverse velocity can be determined from travel velocity and manually set steering deflection or the like, and this theoretical value is then compared with the actual values by a computer and the regulating device is then made to operate as a function of the difference between theoretical and actual values. Supplementary sensors can be arranged for the direct or indirect measurement of the friction value between tires and roadway and are used to influence the control function in response to the vehicle transverse velocity.

It is also advantageous if the steering movements of the supplementary steering system take place independently of the instantaneous steering angle of the front wheels and of the steering activity of a driver, respectively.

Ideally, the steering deflection caused by the supplementary steering system, for the steering angle of the rear wheels ($\delta_{HA}$) should be determined by a computer as follows:

$$\delta_{HA}(t) = K_P \Delta \dot{v}_y(t) + K_D \frac{d}{dt}[\Delta \dot{v}_y(t)] + K_y \int_{t - T_H}^{t} \Delta \dot{v}_y(\tau) d\tau$$

and $T_H$ is a predetermined time interval;
$K_p$, $K_D$ and $K_s$ are predetermined constants;
t is the time;
$\dot{v}_y$ is the change of transverse velocity;
$\dot{v}_{y, actual}$ is the actual value of the change of transverse velocity;
$\dot{v}_{y, theoretical}$ is the theoretical value of the change of transverse velocity, and
$\tau$ is a time variable.

Under such a system, the theoretical value of the change of transverse velocity ($V_{y, theoretical}$) is determined by a computer as follows:

$$\dot{v}_{y,theoretical} = \dot{v}_x \cdot \frac{l_H}{l} \cdot \delta_{VA} + v_x \cdot \frac{l_H}{l} \cdot \dot{\delta}_{VA}$$

where $v_x$, $\dot{v}_x$ are the longitudinal velocity and the change in longitudinal velocity respectively;

$l_H$ is the distance between the rear axle of the vehicle and the center of gravity of the vehicle ($S_p$);

$l$ is the wheel base of the vehicle; and $\delta_{VA}$, $\dot{\delta}_{VA}$ are the steering lock and the change of steering lock of the front wheels respectively.

Other objects, advantages and novel features of the present invention will become apparent from the following detailed description of the invention when considered in conjunction with the accompanying drawings.

BRIEF DESCRIPTION OF THE DRAWINGS

FIG. 2 shows various diagrams for the explanation of the driving behavior with and without a supplementary steering system.

DETAILED DESCRIPTION OF THE DRAWINGS

Figure 1:
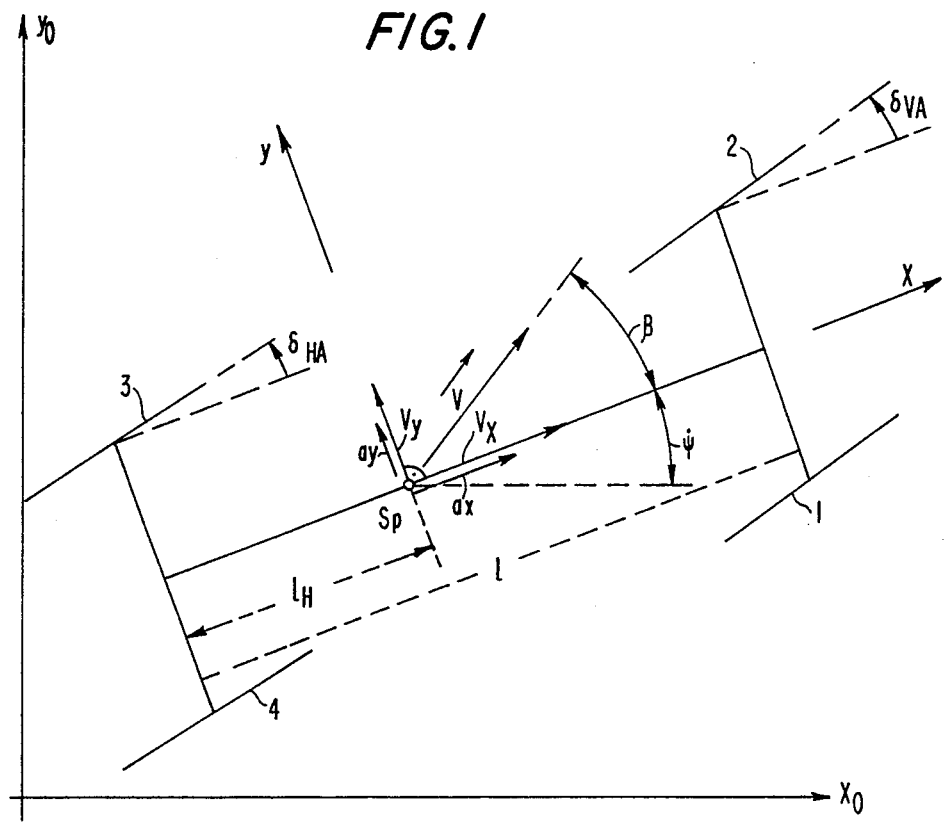
FIG. 1 shows a diagrammatic plan view of a vehicle for the explanation of various quantities.

The vehicle diagrammatically represented in plan view in FIG. 1 possesses steerable front wheels 1 and 2, as well as steerable rear wheels 3 and 4. In this case, the front wheels 1 and 2 are turned through an angle $\delta_{VA}$, while the wheel lock of the rear wheels amounts to $\delta_{HA}$. In order to simplify the representation, in FIG. 1 the wheel locks on the right hand side of the vehicle are of the same size as on the left hand side of the vehicle. Having regard to an exact steering geometry, in which the axes of all wheels are to intersect at the center of curvature under conditions of slip-free travel, the wheel locks of the wheels on the outside of the curve are actually slightly smaller than the wheel locks of the wheels on the inside of the curve. However, this does not need to be considered in the present case, since a correspondingly different setting of the wheel locks necessarily takes place on account of the kinematics of the steering gearing or steering linkage. The angles $\delta_{HA}$ and $\delta_{VA}$ indicated in FIG. 1 can therefore be regarded as mean values of the wheel locks of the front wheels or rear wheels.

The wheelbase, i.e., the spacing of the front axle and rear axle in the longitudinal direction of the vehicle, is designated by $l$. The spacing of the center of gravity $S_p$ of the vehicle from the rear axle in the longitudinal direction of the vehicle amounts to $l_H$.

$x_0, y_0$ designates a coordinate system which is stationary, i.e., fixed in relation to the ground, while $x, y$ form a coordinate system which is fixed in relation to the vehicle and which has its origin at the center of gravity $S_p$ of the vehicle.

The center of gravity $S_p$ might move in accordance with the vector $\vec{v}$, i.e., in a direction which deviates from that path into which the wheels 1 to 4 seek to bring the vehicle. In this case, the floating angle $\beta$ is formed between the direction of the velocity $\vec{v}$ and the longitudinal axis of the vehicle.

In the direction of the transverse axis of the vehicle and in the direction of the longitudinal axis of the vehicle respectively, the velocity $v$; possesses the component $v_y$ and $v_x$.

In the event that the velocity changes, then changes $\dot{V}_x$ and $\dot{V}_y$ in the longitudinal velocity and transverse velocity as well as longitudinal and transverse accelerations $a_x$ and $a_y$ occur. Moreover, the vehicle can possibly rotate with a yaw velocity $\dot{\psi}$ about its vertical axis, whereby the changes of the longitudinal and transverse accelerations can likewise be influenced.

If pitching and rolling movements of the vehicle are disregarded, then the following is applicable:

$$\vec{a} = \dot{\vec{v}} + \dot{\psi} \vec{v}$$

$$a_x = \dot{v}_x - v_y \dot{\psi}$$

$$a_y = \dot{v}_y + v_x \dot{\psi} \text{ and}$$

$$\dot{v}_y = a_y - v_x \dot{\psi}$$

Accordingly, as a result of the rotary m vehicle about its vertical axis the change of transverse velocity $\dot{v}_y$ is not identical to the transverse acceleration $a_y$.

Figure 3:
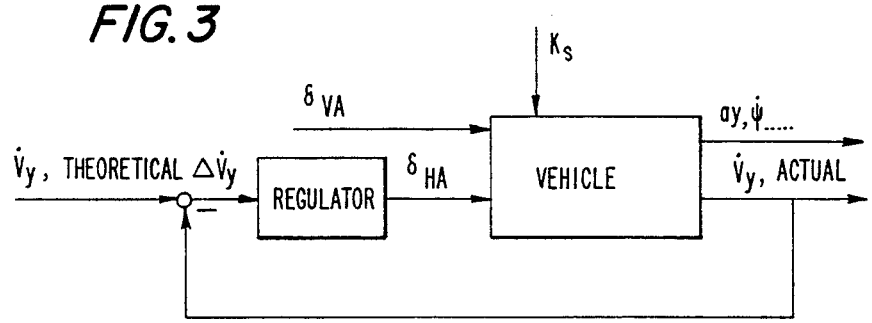
FIG. 3 shows the regulation of a rear wheel supplementary steering system.

According to FIG. 3, the steering lock $\delta_{HA}$ of the rear wheels is controlled by a regulator computer, while the driver determines or changes the steering lock $\delta_{VA}$ of the front wheels. Moreover, disturbance forces $K_s$ generated by roadway and wind effects or the like act on the vehicle. On account of the above-mentioned steering locks and disturbance forces, time-variable actual values become operative for the transverse acceleration ($a_{y, actual}$), the yaw velocity ($\dot{\psi}_{actual}$) etc., as well as the change of transverse velocity ($\dot{v}_{y, actual}$). The actual value $\dot{v}_{y, actual}$ of the change of transverse velocity is now compared with the respective theoretical value $\dot{v}_{y, theoretical}$ in order to determine the control deviation $\Delta \dot{v}_y$. The regulator then brings about a corresponding change of the steering lock of the rear wheels.

In this case, according to a preferred embodiment, the regulator sets the respectively following steering lock $\delta_{HA}(t)$ at a time t:

$$\delta_{HA}(t) = K_P \Delta \dot{v}_y(t) + K_D \frac{d}{dt}[\Delta \dot{v}_y(t)] + K_y \int_{t - T_H}^{t} \Delta \dot{v}_y(\tau) d\tau$$

where $$\Delta \dot{v}_y = \dot{v}_{y, actual} - \dot{v}_{y, theoretical}$$

and $T_H$ is a predetermined time interval and $K_p$, $K_D$, $K_s$ are predetermined constants.

According to a first embodiment of the invention, $\dot{V}_{y, theoretical} = 0$ can be set.

In place of this, it is also possible, and advantageous with regard to an easily controllable driving behavior, to determine and to set for $\dot{v}_{y, theoretical}$ the value which would be obtained on the basis of the respective travel or longitudinal velocity $v_x$ of the vehicle, as well as of the steering locks $\delta_{VA}$ of the front wheels (and, if appropriate, also of the steering locks $\delta_{HA}$ of the rear wheels) as well as of the time variation of these quantities in the case of transversely slip-free travel, i.e., under a roll condition.

According to the above equation, the steering lock $\delta_{HA}$ of the rear wheels is determined by a total of three terms, and specifically by a proportional part (first term), a differential part (second term) as well as an integral part (third term). In this case, the steering lock is, as a rule, determined mainly by the proportional part.

On commencement of skidding movements, when the change of transverse velocity does not remain constant with respect to time, the differential part brings about a supplementary steering lock.

The integral part brings about a further supplementary steering lock if an incipient skidding movement cannot yet be entirely prevented by a steering lock which corresponds to the sum of the proportional and differential parts or if the vehicle rotates with a relatively small change of transverse velocity about its vertical axis, for example on snow or some other smooth roadways. Since in the case of the integral part, the integration takes place in each instance only over a time interval ($T_H$) which directly precedes the respective point in time (t), it is guaranteed that the integral part falls to the value zero in the case of steady circular travel, i.e., when $\dot{v}_y=0$ is applicable.

Since the proportional and differential parts also have the value zero under steady travel conditions, i.e., with $\dot{v}_y=0$, it is guaranteed that the supplementary steering system is reset to its straight-ahead position and the travel behavior does not differ from a vehicle without a supplementary steering system, when a steady travel condition is applicable.

The optimal values for the parameters $K_P$, $K_D$, $K_J$ and $T_H$ are preferably determined and established in travel tests. Since, according to the invention, the steering locks of the supplementary steering system are regulated and not only controlled, constants can without further ado be prescribed for the above-mentioned parameters. If, for example, the travel circumstances change, for example a snow-covered or ice-covered roadway in place of a dry one, then the progression of the transverse velocity necessarily also changes in the course of travel maneuvers or reactions of the vehicle to disturbing influences. On the basis of the changed progression of the transverse velocity, the changed travel circumstances are then indirectly detected by the regulating system and taken into consideration.

If appropriate, it is, however, also possible to detect and to take into consideration at least indirectly, by means of supplementary sensors, at least a part of the travel circumstances, for example the friction value between tires and roadway and to that end the above-mentioned parameters are altered.

The travel behavior of a vehicle without a supplementary steering system is compared with the travel behavior of a vehicle with a supplementary steering system in FIG. 2. In this case, it is assumed that there is a snow-covered roadway and, in accordance with this, a low friction value is, for example, $\mu=0.3$. According to FIG. 2a, the steered wheel is deflected sinusoidally to one side and is reset again to the straight-ahead position. According to the broken-line curves in FIGS. 2b and 2c, in the case of a vehicle without a supplementary steering system, this steering maneuver leads to a marked skidding movement; in this case, a high yaw velocity occurs and continues to be maintained even after termination of the steering maneuver, i.e., the vehicle rotates about its vertical axis. Over and above this, there is an increase in the floating angle $\beta$, i.e., the angle between the longitudinal axis of the vehicle and the direction of movement of the center of gravity of the vehicle. On the other hand, in the case of the vehicle with a supplementary steering system an entirely different and very stable travel behavior occurs, as is reproduced by the curves represented by solid lines in FIGS. 2b and 2c.

Figure 4:
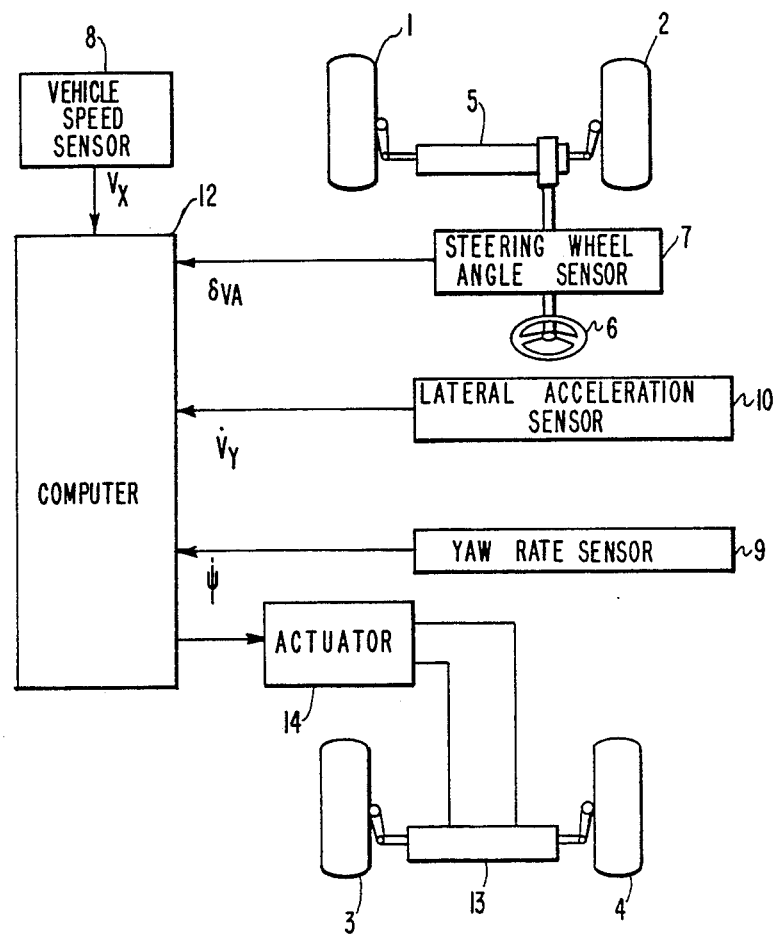
FIG. 4 shows a schematic representation of the control system on a vehicle.

After termination of the steering maneuver, the yaw velocity and the floating angle have very low values, which tend to decrease, and a dangerous skidding movement has thus been prevented. A schematic showing of the control is shown in FIG. 4 wherein a pair of front steerable vehicle wheels 1 and 2 are shown connected through a steering linkage 5 to a steering wheel 6. A pair of rear steerable wheels 3 and 4 are connected via a steering linkage 13 to an actuator 14. The actuator is driven by a computer 12 in response signals from a speed sensor 8, front steering wheel angle sensor 7, side acceleration sensor 10 and YAW speed sensor 9. The computer combines these signals in accordance with the above mentioned logic to input a control signal to actuator 14 for adjusting the steering angle of the vehicle's rear wheels 3,4.

The supplementary steering system according to the invention is expediently combined with an anti-lock system for the service brake of the vehicle, as well as with a drive slip control system. It is thus guaranteed that neither in the course of acceleration, nor in the course of braking of the vehicle, can an excessive longitudinal slip of the wheels occur, which would lead to a loss of the lateral guiding force of the wheels. Thus, the supplementary steering system can also achieve its full efficiency in the course of braking and acceleration maneuvers.

The supplementary steering system prevents or alleviates, in particular, those skidding movements which are caused, for example, by loss of lateral force on account of excessively large fluctuations of wheel load, e.g., in the case of defective shock absorbers, in the case of circular travel on an uneven roadway;

by rapid steering maneuvers, in order, for example, to avoid an obstruction; or by fluctuation of the friction value of the roadway (dry or ice-covered or snow-covered roadway).

In order to be able to measure the change of transverse velocity of the vehicle or a quantity correlated therewith, the vehicle possesses appropriate sensors (actual value generators) which are conventional in the trade, so that the supplementary steering system can be controlled by comparison of the theoretical and actual values of the change of transverse velocity of the vehicle or of the quantity correlated therewith, in the sense of the invention.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A supplementary steering system for rear wheel supplementary steering systems of motor vehicles, having a steering means for controlling the steering angle of front wheels of the vehicle and regulating means which deflects steered rear vehicle wheels as a function of a quantity solely responsive to vehicle; longitudinal velocity, transverse acceleration and yaw velocity for stabilizing the vehicle at skidding situations;

on the occurrence of a skidding movement of the vehicle associated with a rapidly increasing transverse velocity of the vehicle, and regulating means deflects the steered rear wheels in the sense of a counter-steering with respect to said steering angle of the front wheels for counteracting the skidding movement; and said regulating means only controls a respective lock angle of the steered rear wheels when a change of vehicle transverse velocity exceeds a theoretical change of vehicle transverse velocity;

said regulating means including a computer which determines the steering deflection and steering angle of the rear wheels ($\delta_{HA}$), by the following equation:

$$\delta_{HA}(t) = K_p \Delta \dot{v}_y(t) + K_D \frac{d}{dt}[\Delta \dot{v}_y(t)] + K_y \int_{t-T_H}^{t} \Delta \dot{v}_y(\tau) d\tau$$

$T_H$ is a predetermined time interval;
$K_p$, $K_D$ and $K_s$ are predetermined constants;
t is the time;
$\dot{v}_y$ is the change of transverse velocity;
$\dot{v}_{y,\,actual}$ is the actual value of the change of transverse velocity;
$\dot{v}_{y,\,theoretical}$ is the theoretical value of the change of tranverse velocity, and
$\tau$ is a time variable;

said theoretical value of the change of tranverse velocity ($\dot{v}_{y,\,theoretical}$) is determined by the following equation:

$$\dot{v}_{y,theoretical} = \dot{v}_x \cdot \frac{l_H}{l} \cdot \delta_{VA} + v_x \cdot \frac{l_H}{l} \cdot \dot{\delta}_{VA}$$

where
$v_x$, $\dot{v}_x$ are the longitudinal velocity and the change in longitudinal velocity respectively;
$l_H$ is the distance between the rear axle of the vehicle and the center of gravity of the vehicle ($S_p$);
l is the wheel base of the vehicle; and
$\delta_{VA}$, $\dot{\delta}_{VA}$ are the steering lock and the change of steering lock of the front wheels respectively.

2. A supplementary steering system according to claim 1, wherein the regulating means that causes the deflection of the steered rear wheels as a function of the change of vehicle transverse velocity acts with the change of the vehicle transfer with respect to time.

3. A supplementary steering system according to claim 1 wherein the computer determines the theoretical value of the change of transverse vehicle velocity from vehicle travel velocity and manually set front wheel steering deflection and compares this with respective actual values of changes of vehicle travel velocity, and wherein the regulating means operates as a function of the difference between the changes in theoretical and actual values of transverse vehicle velocity.

4. A supplementary steering system according to claim 2 wherein the computer determines the theoretical value of the change of transverse vehicle velocity from vehicle travel velocity and manually set front wheel steering deflection and compares this with respective actual values of changes of vehicle travel velocity, and wherein the regulating means operates as a function of the difference between the changes in theoretical and actual values of transverse vehicle velocity.

5. A supplementary steering system according to claim 1, wherein supplementary sensors are arranged for measurements of a friction value between vehicle tires and roadway and this friction value is used to vary the function of the change of vehicle tranverse velocity.

6. A supplementary steering system according to claim 2, wherein supplementary sensors are arranged for measurement of a friction value between vehicle tires and roadway and this friction is used to vary the function of the change of vehicle transverse velocity.

7. A supplementary steering system according to claim 3, wherein supplementary sensors are arranged for measurement of a friction value between vehicle tires and roadway and this friction value is used to vary the function of the change of vehicle transverse velocity.

8. A supplementary steering system according to claim 4, wherein supplementary sensors are arranged for measurement of a friction value between vehicle tires and roadway and this friction value is used to vary the function of the change of vehicle transverse velocity.

9. A supplementary steering system according to claim 1, wherein the steering movements of the supplementary steering system take place independently of any instantaneous steering angle of the vehicle front wheels and of any steering activity by a driver of the vehicle.

* * * * *